Figure 1:
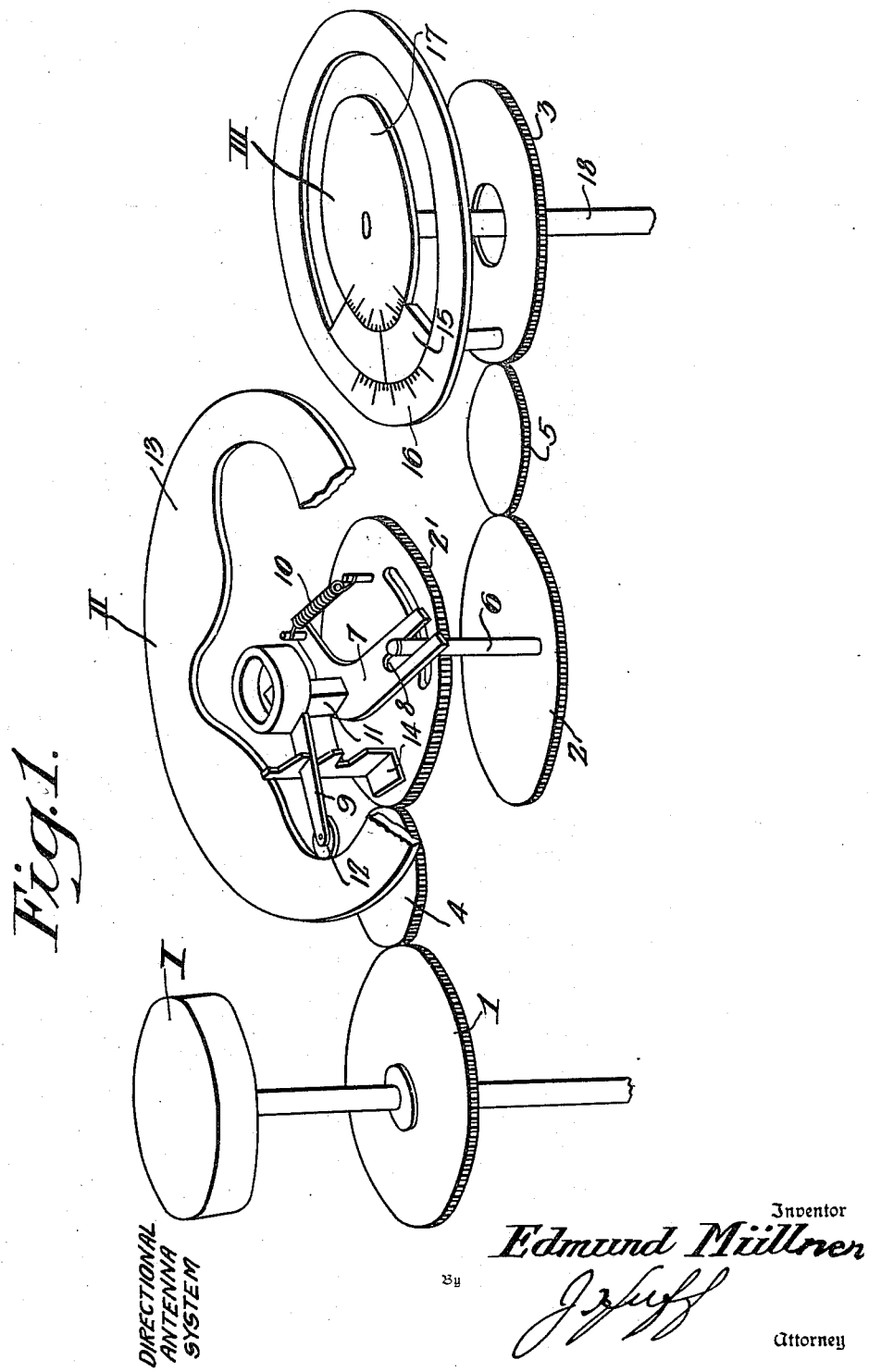

Feb. 3, 1942. E. MÜLLNER 2,271,564
COMPENSATED SCALE FOR INDICATING BEARINGS
Filed July 11, 1938 2 Sheets-Sheet 1

Inventor
Edmund Müllner
By
Attorney

Feb. 3, 1942. E. MÜLLNER 2,271,564
COMPENSATED SCALE FOR INDICATING BEARINGS
Filed July 11, 1938 2 Sheets-Sheet 2

Inventor
Edmund Müllner
By
Attorney

Patented Feb. 3, 1942

2,271,564

UNITED STATES PATENT OFFICE 2,271,564

COMPENSATED SCALE FOR INDICATING BEARINGS

Edmund Müllner, Berlin-Lichterfelde, Germany, assignor to Telefunken Gesellschaft für Drahtlose Telegraphie m. b. H., Berlin, Germany, a corporation of Germany Application July 11, 1938, Serial No. 218,667
In Germany July 17, 1937

4 Claims. (Cl. 250—11)

It is known in the prior art that when taking bearings the position of the direction finding antenna or the direction finding wheel set, say, to minimum or zero signal strength as a general rule does not indicate the true bearing angle. In fact, it is known from practice that the influence of the neighborhood of the direction finder plays a certain part on the ground; that metallic objects located in the neighborhood of the direction finder antenna, by virtue and as a result of reflection, introduce a further component in the radiations coming from the transmitter or beacon. This causes a fictitious or apparent turn in the direction whence signals come in, with the result that, for instance, in setting the direction finding frame or loop to minimum signal strength, the bearing or angle thus ascertained must be corrected either in the positive or the negative sense a certain amount.

These angular corrections as a rule are determined experimentally, preferably by the aid of comparisons with the results of optical bearing data. The figures thus found are compiled in tabular or graphic form (by curves).

In order to dispense with the necessity of referring to tabulated or graphically expressed values and thus avoid the computation work (that is, addition or subtraction of correction values) arrangements have been suggested in the prior art designed to effect the correction of the observed radio bearing by mechanical ways and means. In arrangements of this nature known in the prior art the indicator or reading means is in coupling relationship with the direction finder frame or wheel by way of a suitable gear rather than directly, with the result that the pointer, as the direction finding wheel is turned, will not move in synchronism therewith, but with a certain amount of lead or lag corresponding to the required correction.

Now, it is known that these corrective values markedly depend upon the frequency of the signal waves used for direction finding. In other words, it is necessary to provide several distinct corrector discs for the observed radio bearings, and these must be connected replaceably so as to suit work with various wave lengths. However, in arrangements heretofore disclosed or used in practice, the work of substitution of corrector discs is attended with certain difficulties insofar as the whole outfit must be demounted, all for the purpose of merely replacing a disc.

Now, the present invention discloses ways and means whereby the said difficulties may be obviated. The arrangement here disclosed has the outstanding feature that the reading scale or dial, or the pointer thereof, is in positive coupling relationship with the setting mechanism of the direction finder through the intermediary of a wheel gearing, and that this mechanical transmission gear comprises a coupling means or link which operates in dependence upon the correction graph or chart. More particularly speaking, there are provided two discs adjustable in relation to each other by means of levers disposed concentrically to the spindle and set by the corrector curve, one of the said discs being in engagement with the setting mechanism of the directional antenna and the other one in engagement with the indicator means.

The arrangement here disclosed shall now be described in more detail by reference to the drawings in which—

Figure 2:
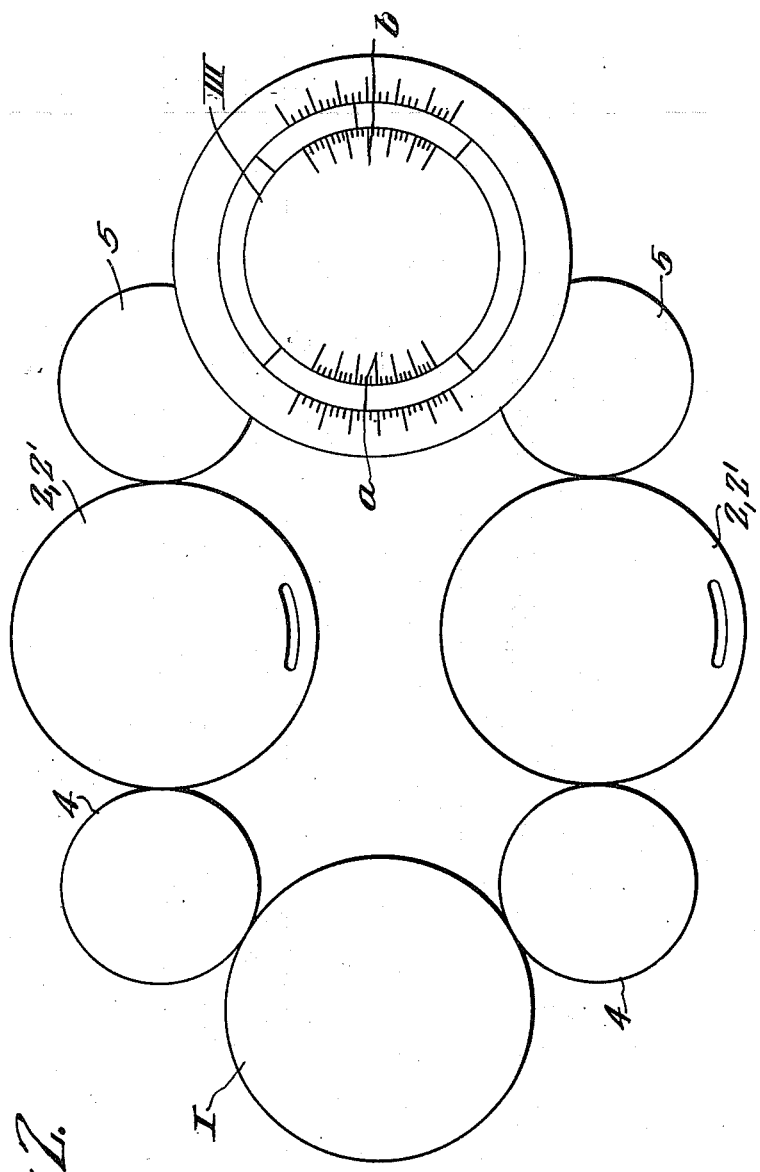

Fig. 1 is a perspective view of an embodiment of my invention for correcting the directional error of an antenna; and Fig. 2 is a schematic diagram of a modification of my invention.

Referring to Fig. 1, I denotes the directional antenna system, II designates the bearing corrector means, and III is the bearing indicator or reading means. In order that a 1:1 ratio of transmission between arrangement I and arrangement III may be obtained, four tooth-wheel discs 1, 2, 2' and 3 of equal size are provided. Discs 1 and 2' are in positive meshed relation by a tooth-wheel 4, while discs 2 and 3 are also positively coupled by a tooth-wheel 5 of similar size. Transmission of torque between tooth-wheels 2 and 2' mounted in superposed relationship is insured by the agency of a driver pin 6 which is held in a slot in the tooth-wheel 2'. The said pin 6 is fixedly mounted on the tooth-wheel 2, and the same is guided by a lever arrangement 7 comprising, in turn, the two limbs 8 and 9. The said lever mechanism 7 is placed in eccentric relation to the spindle or axis of the two discs 2 and 2', and the same is held in a fixed starting position relative to disc 2' by the agency of a spring 10. The limb or arm 9 of the lever arrangement, since it is disposed on a quadrangular bolt 11, is adjustable in axial direction. The outer end thereof supports a disc or pulley 12 adapted to run on a corrector curve recessed in the disc 13. Adjustment of the relative position between the discs 2 and 2' is effected as a function of the position occupied by lever 9 at any given time. Disc 13 actually is a disc closed circularly upon itself; it is here shown cut open at two places merely for the sake of greater clarity of illustration.

Now, in the arrangement of this invention, a plurality of discs 13 containing correction curves to be adapted to given frequencies may be fixedly arranged in superposed position. To change from one disc to another disc, all that is necessary is to axially shift the lever 9 which is guided in a rack 14 seated upon the disc 2' to an extent so that the roller or pulley 12 is brought in contact with the correction curve corresponding to a given or desired frequency or wave length. In other words, the present arrangement insures a ready and easy adjustment of the correction of radio bearings throughout the various frequency ranges.

Further transmission from the corrector gear II to the reading or indicator gear III is accomplished by ways and means known in the prior art, namely, by suitable indicator pointer or mark 15 which is caused to slide past or over the graduated dial or scale 16. Now, according to a further object of the invention the compass dial 17 may be disposed inside the said indicator device, the said dial 17 being driven by means of shaft 18 from a standard gyro compass.

Now, in reading the direction finder scale for both of the loop indicating positions which are due to its bidirectional characteristic it is necessary to effect radio bearing correction separately, for the two positions. In Fig. 2 where the two sides $a$ and $b$ of the indicator arrangement III are represented, the corrector means will have to be provided in duplicate. According to Fig. 2, the discs 2 and 2', the gear 3 and the indicator 15, as well as the transmission wheels 4 and 5 must be provided in duplicate. I again denotes the directional antenna gear.

I claim as my invention:

1. A compensated radio direction finder including a rotatable bidirectional antenna, a pair of calibrated scales, indicators for reading bearings on said scales, means independently coupling said indicators to said antenna so that rotation of said antenna moves said indicators with respect to said scales, one of said coupling means including means for correcting the indicated bearing to correspond to the true bearing of a signal received from a given direction, the other of said coupling means including means for correcting the indicated bearing to correspond to the true bearing of a signal received from an opposite direction.

2. A compensated radio direction finder including a rotatable loop antenna, a pair of calibrated scales, indicators movable with respect to said scales for reading bearings, cam-controlled means separately coupling said indicators to said antenna so that the rotation of said antenna moves said indicators with respect to said scales, one of said cams being shaped so as to correct the position of one of said indicators to correspond to the true bearing of a signal received from a given direction, and the other of said cams being shaped so as to correct the position of the other of said indicators to correspond to the true bearing of a signal received from an opposite direction, whereby corrected bearings may be taken with said loop antenna in either one of two direction-finding positions.

3. A direction finding receiver arrangement for use with a rotatable main frame antenna or goniometer inherently subject to bearing errors which are not uniform in opposite directions, comprising a direction finding scale having sets of marks thereon for indicating the transmitting direction and the opposite direction, a pair of relatively adjustable indicating means rotatable relative to said scales and cooperating with said sets of marks for indicating the opposite directions of pointing of said rotatable frame, and error compensating means cooperating with each of said indicating means for adjusting said indicating means independently of each other to automatically compensate for said bearing errors in each direction of pointing.

4. A direction finding receiver arrangement for use with a rotatable main frame antenna or goniometer inherently subject to bearing errors which are not uniform in opposite directions, comprising a direction finding scale having sets of marks thereon for indicating the transmitting direction and the opposite direction, a pair of relatively adjustable indicating means rotatable relative to said scales and cooperating with said sets of marks for indicating the opposite directions of pointing of said rotatable frame, and error compensating means comprising curve plates cooperating with each of said indicating means for adjusting said indicating means independently of each other to automatically compensate for said bearing errors in each direction of pointing.

EDMUND MÜLLNER.